United States Patent
Muldoon (10) Patent No.: US 11,821,362 B2
(45) Date of Patent: Nov. 21, 2023

(54) GAS TURBINE ENGINE CORE DEBRIS CLEANER

(71) Applicant: Raytheon Technologies Corporation, Farmington, CT (US)

(72) Inventor: Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/719,458

(22) Filed: Apr. 13, 2022

(65) Prior Publication Data

US 2023/0332542 A1  Oct. 19, 2023

(51) Int. Cl.
*F02C 7/05* (2006.01)
*F02C 7/052* (2006.01)

(52) U.S. Cl.
CPC .............. *F02C 7/05* (2013.01); *F02C 7/052* (2013.01)

(58) Field of Classification Search
CPC ............... F02C 7/05; F02C 7/052; F02C 9/52
See application file for complete search history.

(56) References Cited

U.S. PATENT DOCUMENTS

| | | | |
|---|---|---|---|
| 3,993,463 A | 11/1976 | Barr | |
| 5,279,109 A | 1/1994 | Liu et al. | |
| 10,287,992 B2 | 5/2019 | Tan et al. | |
| 10,830,438 B2 * | 11/2020 | Banks | F04D 27/0215 |
| 2011/0023446 A1 * | 2/2011 | Avellan | F02K 3/06 60/39.23 |
| 2014/0119891 A1 * | 5/2014 | Schmittenberg | F02C 7/05 415/121.2 |
| 2015/0300254 A1 * | 10/2015 | Stretton | F02C 7/18 137/15.1 |
| 2016/0123227 A1 * | 5/2016 | Murray | B01D 45/16 55/339 |
| 2018/0021711 A1 | 1/2018 | Mook et al. | |
| 2019/0264616 A1 * | 8/2019 | Lovett | F01D 9/06 |
| 2020/0308989 A1 | 10/2020 | Buhler et al. | |

FOREIGN PATENT DOCUMENTS

GB    2164391 A    3/1986

OTHER PUBLICATIONS

Extended European Search Report for application No. 23167810.3; dated Jul. 18, 2023; 12 pages.

\* cited by examiner

*Primary Examiner* — Steven M Sutherland
(74) *Attorney, Agent, or Firm* — CANTOR COLBURN LLP (57) ABSTRACT

An assembly of a gas turbine engine includes a low pressure compressor, a high pressure compressor, an intermediate case between the low pressure compressor and the high pressure compressor, and a cleaning apparatus having an annular arrangement about the intermediate case. A core flow path is defined through the low pressure compressor, the intermediate case, and the high pressure compressor. The annular arrangement includes a scroll portion configured to extract debris from an airstream at an outer diameter wall of the core flow path and return the airstream to the core flow path.

19 Claims, 6 Drawing Sheets

GAS TURBINE ENGINE CORE DEBRIS CLEANER

TECHNICAL FIELD

The present disclosure relates generally to turbine engines and aircraft engines, and more specifically to a turbine engine with a core debris cleaning apparatus.

BACKGROUND

Engines, such as gas turbine engines, can operate in unclean environments that result in ingestion of dust, dirt, and debris. Particulate matter can accumulate within an engine as it operates over a period of time. The particulate matter can result in degraded performance, such as component life reduction. Regular engine cleaning can remove environmental particulate matter; however, cleaning and servicing performed manually based on a predetermined time interval may result in late actions relative to the actual condition of an engine, which can allow latent accumulation to impact performance until cleaning occurs.

BRIEF SUMMARY

According to some embodiments, an assembly of a gas turbine engine includes a low pressure compressor, a high pressure compressor, an intermediate case between the low pressure compressor and the high pressure compressor, and a cleaning apparatus having an annular arrangement about the intermediate case. A core flow path is defined through the low pressure compressor, the intermediate case, and the high pressure compressor. The annular arrangement includes a scroll portion configured to extract debris from an airstream at an outer diameter wall of the core flow path and return the airstream to the core flow path.

In addition to one or more of the features described above or below, or as an alternative, embodiments may include where the cleaning apparatus includes an inlet proximate to the low pressure compressor.

In addition to one or more of the features described above or below, or as an alternative, embodiments may include where the cleaning apparatus includes a channel external to the outer diameter wall of the core flow path that defines an airflow path between the inlet and the scroll portion.

In addition to one or more of the features described above or below, or as an alternative, embodiments may include an inlet door configured to open and close an air path between the core flow path and the airflow path at the inlet.

In addition to one or more of the features described above or below, or as an alternative, embodiments may include a stability bleed valve upstream of the inlet and a controller configured to synchronize opening and closing of the inlet door with opening and closing of the stability bleed valve.

In addition to one or more of the features described above or below, or as an alternative, embodiments may include where the cleaning apparatus includes a detachable debris collector that is separable from the assembly while the scroll portion remains coupled to the assembly.

In addition to one or more of the features described above or below, or as an alternative, embodiments may include an airflow return port configured to return the airstream from the cleaning apparatus in a direction substantially parallel to a flow direction of the airstream in the core flow path.

In addition to one or more of the features described above or below, or as an alternative, embodiments may include where the cleaning apparatus is integrally formed with an engine case of the outer diameter wall of the intermediate case.

In addition to one or more of the features described above or below, or as an alternative, embodiments may include where the scroll portion includes one or more debris collection surfaces having a different surface texture than other interior surfaces of the cleaning apparatus.

According to some embodiments, a method includes receiving an airstream at an outer diameter wall of a core flow path in a gas turbine engine downstream of a stability bleed valve, directing the airstream through a cleaning apparatus with an annular arrangement configured to extract debris from the airstream, and returning the airstream to the core flow path upstream of a high pressure compressor of the gas turbine engine.

In addition to one or more of the features described above or below, or as an alternative, embodiments may include where the annular arrangement includes a scroll portion configured to extract debris.

In addition to one or more of the features described above or below, or as an alternative, embodiments may include where the cleaning apparatus includes an inlet proximate to a low pressure compressor of the gas turbine engine and a channel external to the outer diameter wall of the core flow path that defines an airflow path between the inlet and the scroll portion.

In addition to one or more of the features described above or below, or as an alternative, embodiments may include controlling an inlet door configured to open and close an air path between the core flow path and the airflow path at the inlet.

In addition to one or more of the features described above or below, or as an alternative, embodiments may include where the stability bleed valve is upstream of the inlet and the method further includes synchronizing opening and closing of the inlet door with opening and closing of the stability bleed valve.

In addition to one or more of the features described above or below, or as an alternative, embodiments may include where the stability bleed valve is closed while the inlet door is opened such that debris extraction is exclusively performed by the cleaning apparatus.

In addition to one or more of the features described above or below, or as an alternative, embodiments may include collecting debris captured by the annular arrangement in a detachable debris collector that is separable from the gas turbine engine while the scroll portion remains coupled to the gas turbine engine.

In addition to one or more of the features described above or below, or as an alternative, embodiments may include collecting debris in the scroll portion on one or more debris collection surfaces having a different surface texture than other interior surfaces of the cleaning apparatus.

In addition to one or more of the features described above or below, or as an alternative, embodiments may include where returning the airstream to core flow path includes directing the airstream from the cleaning apparatus in a direction substantially parallel to a flow direction of the airstream in the core flow path.

According to some embodiments, an intermediate case of a gas turbine engine includes an inner diameter wall, an outer diameter wall, and a cleaning apparatus having an annular arrangement about the outer diameter wall. A core flow path is defined between the inner diameter wall and the outer diameter wall. The annular arrangement includes a scroll portion configured to extract debris from an airstream at the outer diameter wall and return the airstream to the core flow path.

In addition to one or more of the features described above or below, or as an alternative, embodiments may include where the cleaning apparatus includes an inlet and a channel external to the outer diameter wall that defines an airflow path between the inlet and the scroll portion.

In addition to one or more of the features described above or below, or as an alternative, embodiments may include where the cleaning apparatus is integrally formed with an engine case of the outer diameter wall.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
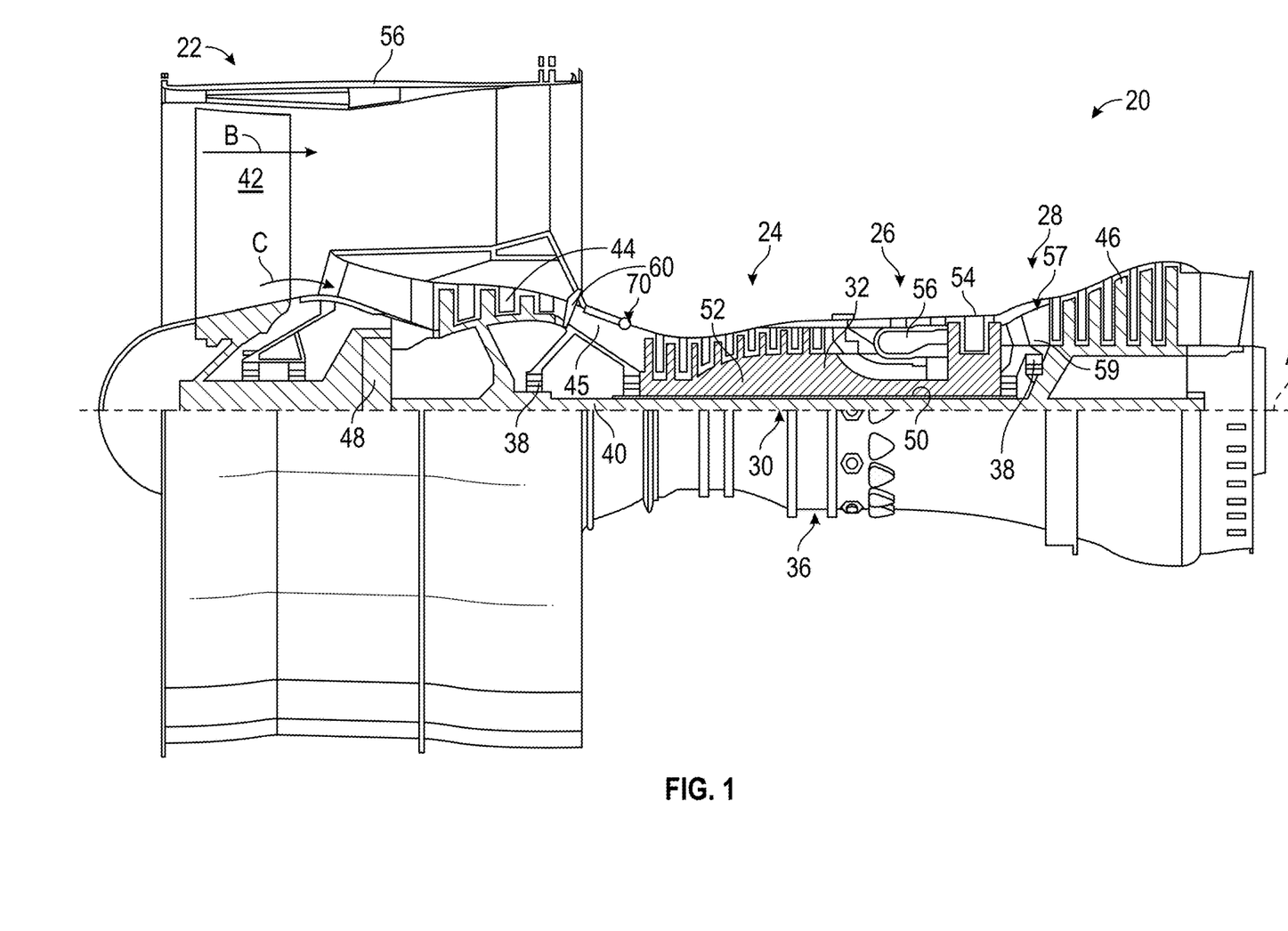
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is a gas generator configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. An intermediate case 45 can include a transition region between the low pressure compressor 44 and the high pressure compressor 52. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

If debris, such as dirt/sand, is entrained in the core airflow path C that is ingested into the core of gas turbine engine 20, the debris can negatively impact the durability of cooled hot section components, such as the combustor 56 and turbines 46, 54 because the debris may clog cooling passages and build up on impingement surfaces, thus reducing the efficiency of heat conduction. Air contamination primarily occurs at takeoff and landing due to the higher concentration of dirt particles near the ground. Because the harmful debris is heavier than air, it tends to be centrifuged out along an outer flowpath of the core airflow path C by rotating compressor stages. For this reason, opening a stability bleed valve 60, which is situated along the outer flowpath after the low pressure compressor 44, can be used to remove some entrained dirt from the core airflow path C. However, opening the stability bleed valve 60 to vent a dirt-entrained airflow to atmosphere can have a negative impact on cycle efficiency, as compressed air is dumped overboard at a high-power setting of the gas turbine engine 20. Additionally, a significant amount of debris can remain entrained in the core airflow path C. To provide enhanced cleaning of the core airflow path C, embodiments can include a cleaning apparatus 70 configured to extract debris from an airstream of the core airflow path C and return a cleaned airstream upstream of the high pressure compressor 52. The cleaning apparatus 70 is described in greater detail herein.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
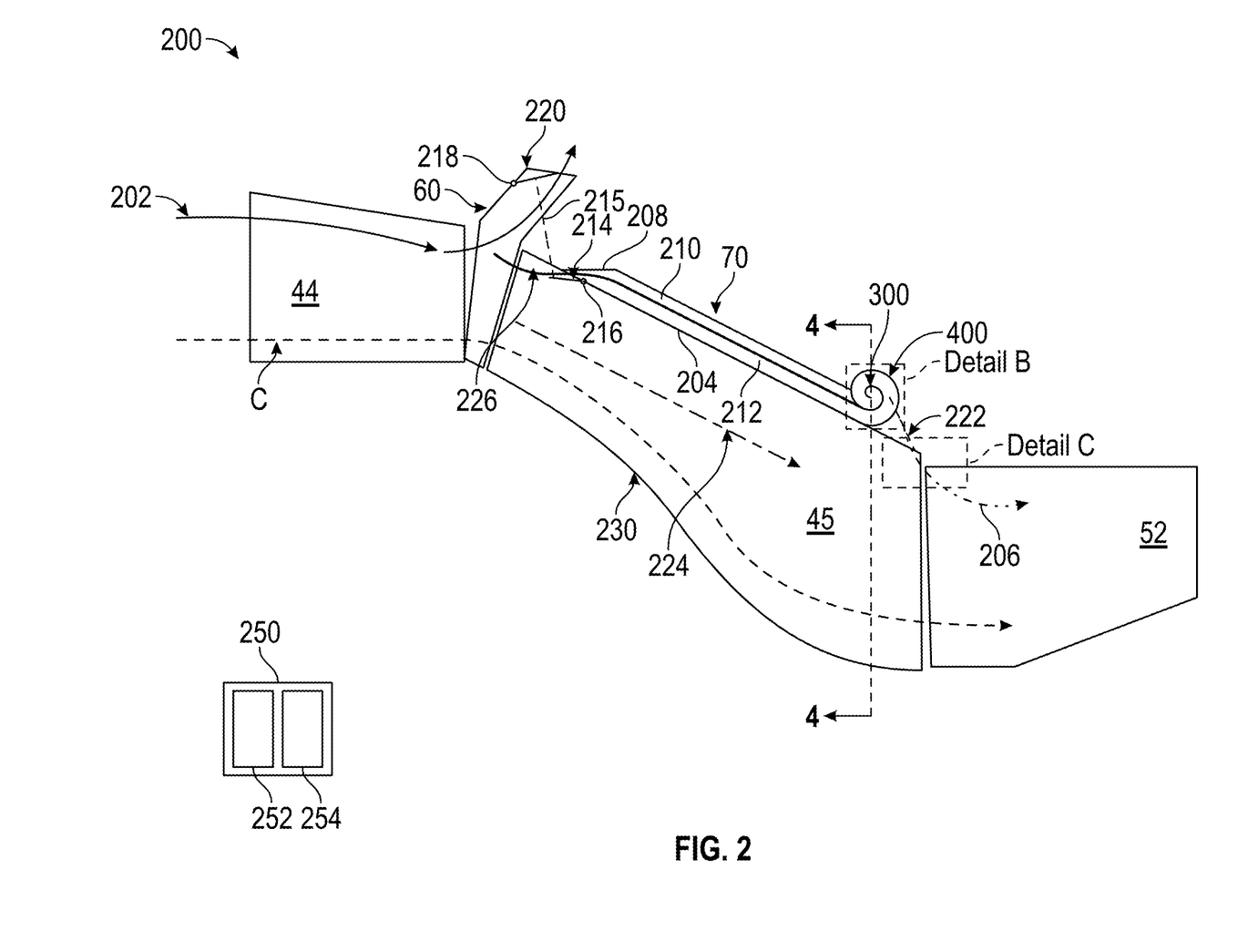
FIG. 2 is a schematic illustration of an assembly of the gas turbine engine with a cleaning apparatus in accordance with an embodiment of the present disclosure.
Figure 3:
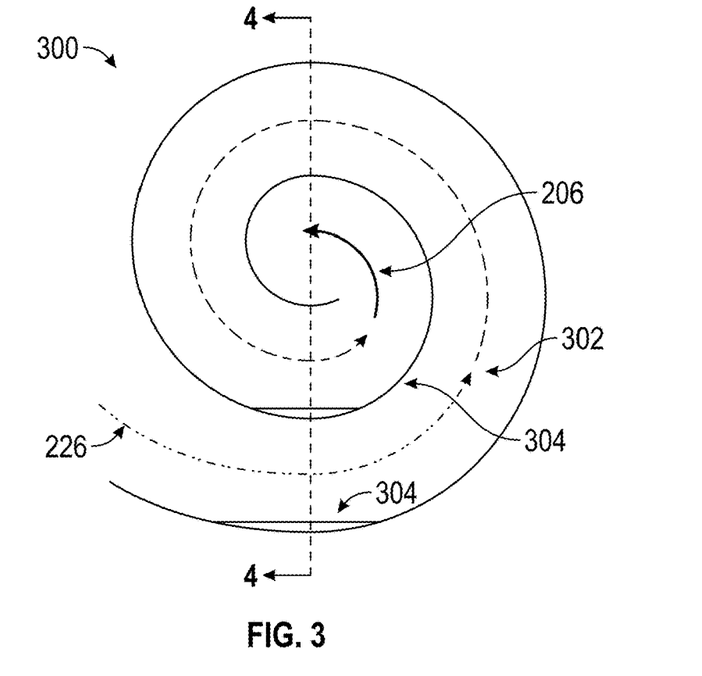
FIG. 3 is a schematic illustration of a scroll portion of the cleaning apparatus in accordance with an embodiment of the present disclosure.
Figure 4:
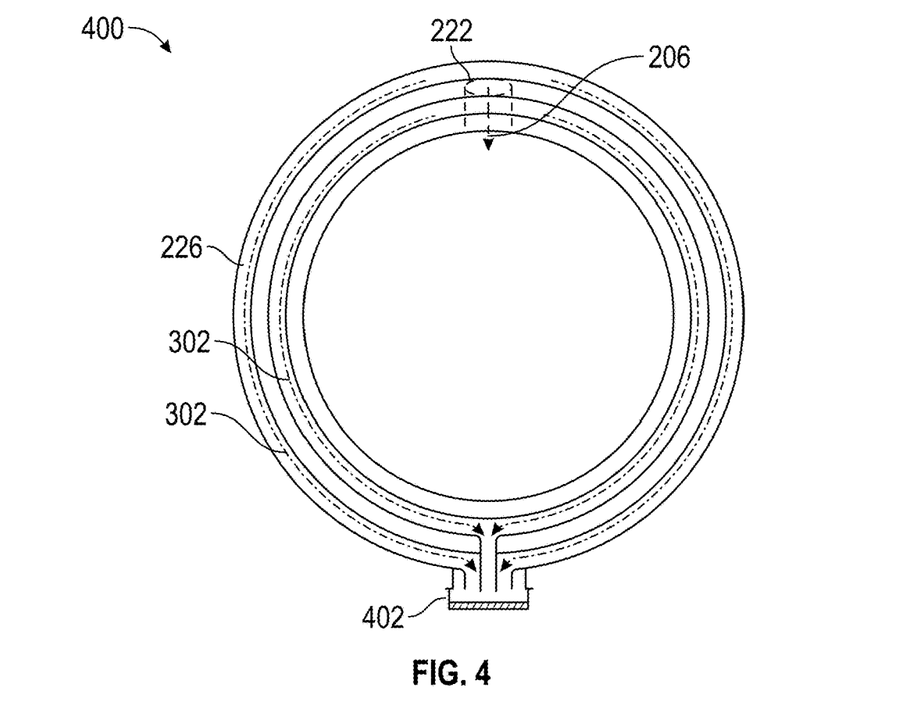
FIG. 4 is a schematic illustration of an annular arrangement of the cleaning apparatus in accordance with an embodiment of the present disclosure.
Figure 5:
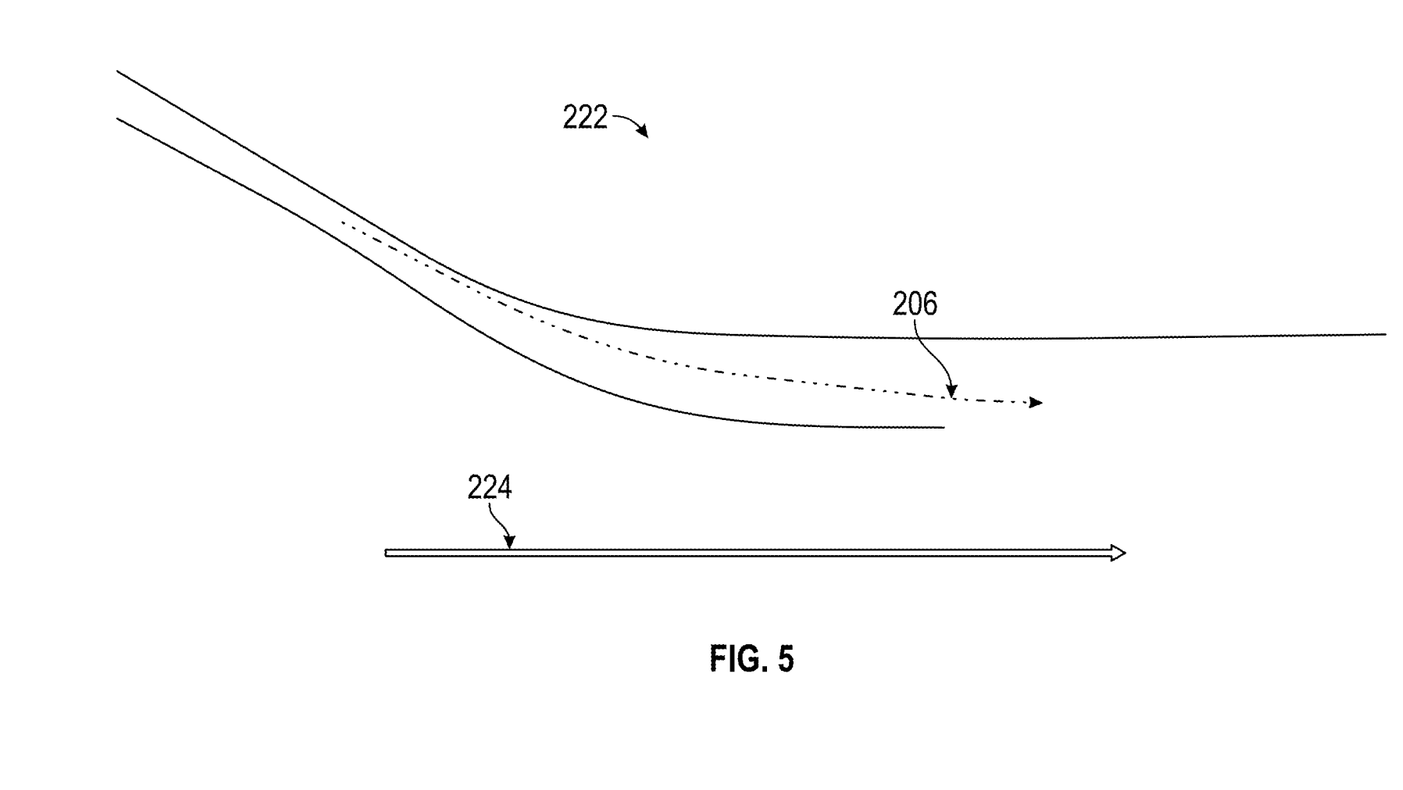
FIG. 5 is a schematic illustration of an airflow return port within the gas turbine engine in accordance with an embodiment of the present disclosure.

Turning now to FIGS. 2-6, a schematic diagram of an assembly 200 of the gas turbine engine 20 with cleaning apparatus 70 is depicted in accordance with an embodiment of the present disclosure. In the example of FIG. 2, a core flow path C is defined through the low pressure compressor 44, the intermediate case 45, and the high pressure compressor 52 of the assembly 200. The cleaning apparatus 70 has an annular arrangement 400 (as best seen in FIG. 4) about the intermediate case 45. The annular arrangement 400 includes a scroll portion 300 (as best seen in FIG. 3) configured to extract debris from an airstream 202 at an outer diameter wall 204 of the intermediate case 45 from the core flow path C and return a cleaned airstream 206 to the core flow path C. The cleaning apparatus 70 can include an inlet 208 proximate to the low pressure compressor 44. The cleaning apparatus 70 can also include a channel 210 external to an outer diameter wall 204 of the core flow path C that defines an airflow path 212 between the inlet 208 and the scroll portion 300. An inlet door 214 can be configured to open and close an air path between the core flow path C and the airflow path 212 at the inlet 208.

In the example of FIG. 2, a stability bleed valve 60 is upstream of the inlet 208. A controller 250 can be configured to synchronize opening and closing of the inlet door 214 with opening and closing of the stability bleed valve 60. In some embodiments, the controller 250 can include or control one or more mechanical linkages 215 to control movement of the inlet door 214 and the state of the stability bleed valve 60. An inlet door actuator 216 can drive movement of the inlet door 214. A valve actuator 218 can drive movement of a valve door 220 of the stability bleed valve 60.

The assembly 200 can also include an airflow return port 222 configured to return the airstream (e.g., cleaned airstream 206) from the cleaning apparatus 70 in a direction substantially parallel to a flow direction of an airstream (e.g., airstream 224 upon reaching a location of the airflow return port 222) in the core flow path C. When the valve door 220 is opened slightly, a portion of the airstream 202 that can include debris is drawn out of the stability bleed valve 60. Airstream 226 can include a portion of the airstream 202 proximate to the outer diameter wall 204 that can include debris that was not ejected through the stability bleed valve 60. Airstream 226 is cleaned by the cleaning apparatus 70 and returned to the core flow path C as cleaned airstream 206. Air closer to an inner diameter wall 230 of the intermediate case 45 is typically clean, while the airstream 224 may include fine debris that was not forced to the outer diameter wall 204. The core flow path C can be defined between the inner diameter wall 230 and the outer diameter wall 204 of the intermediate case 45.

Figure 6:
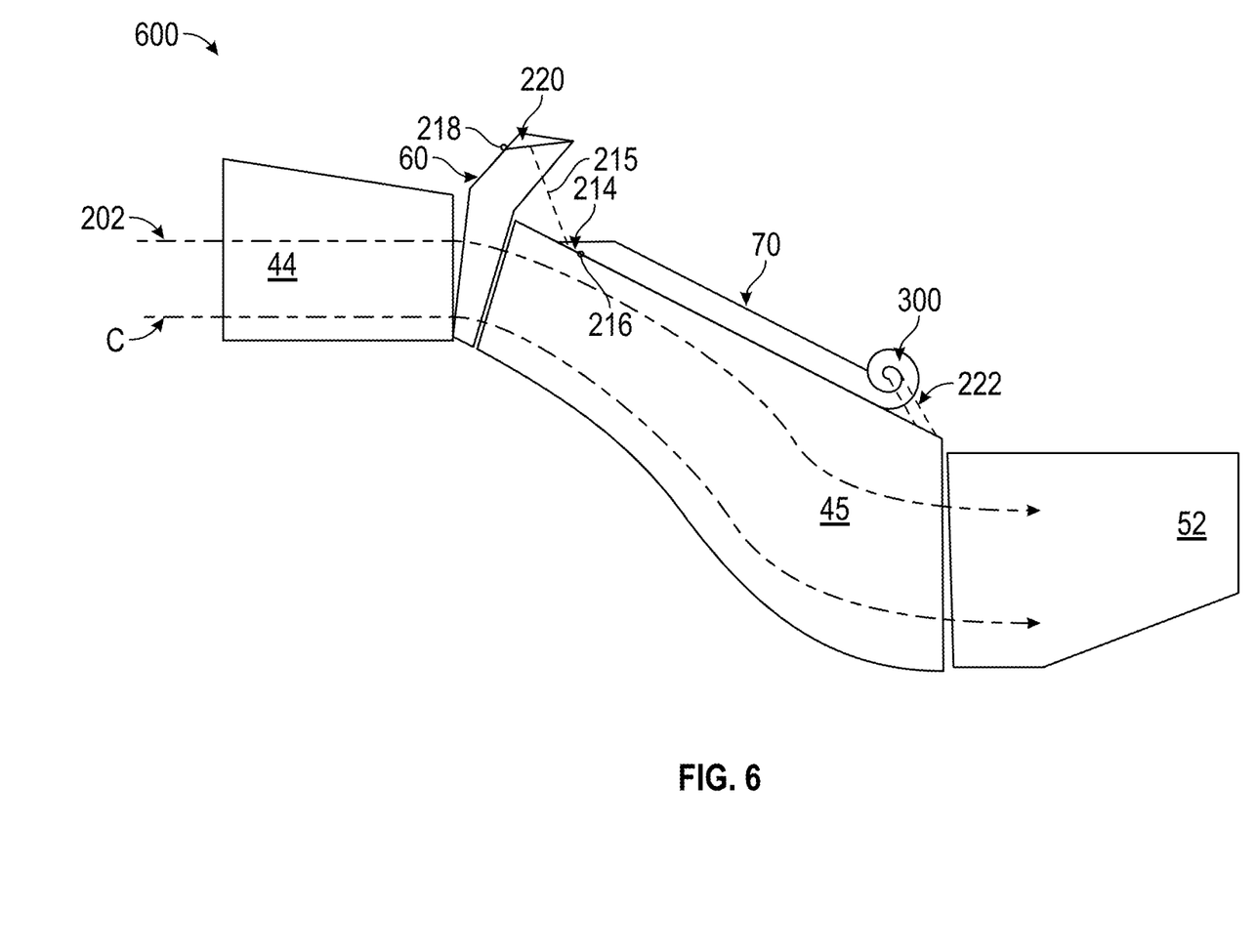
FIG. 6 is a schematic illustration of the assembly of the gas turbine engine with the cleaning apparatus in a low debris intake configuration in accordance with an embodiment of the present disclosure.

By incorporating one or more offtakes (e.g., inlets 208) along the outer diameter wall 204, downstream of the stability bleed valve 60, dirty air can be directed into a scroll-shaped cleaning annulus of the scroll portion 300. The annular arrangement 400 can separate dirt/debris from air through a series of spiraling passages 302 (FIG. 3) using gravitational and inertial forces. The passages 302 can use customized surface textures 304 (e.g., a non-smooth surface) to encourage dirt retention in the desired locations. The collected dirt/debris would then fall to the bottom of the gas turbine engine 20 due to gravitational and vibratory forces and be collected in a detachable debris collector 402 that can be emptied by ground crews during routine maintenance checks (on the same schedule as an oil filter change, for example). An airstream 206 of cleaned air is diverted back to the core flow path C near the top of the engine at airflow return port 222, for instance, as far away from the collected dirt/debris as possible. The internal passages 302 can be designed to be sufficiently larger than the inlet 208 and smoothly formed to reduce pressure loss. An adequate delta pressure to force air through the cleaning apparatus 70 can use a combination of ram air effect at the inlet 208 as well as the potential for an ejector at the outlet of airflow return port 222 (best seen in FIG. 5). Because dirt/debris ingestion is only an issue at low altitude, the inlet door 214 can be controlled to only open at take-off and landing and may be actuated in combination with the valve door 220 of the stability bleed 60. When the inlet door 214 and the valve door 220 are both shut and the gas turbine engine 20 is operating in a clean air environment (e.g., several hundred meters above ground level), the airstream 202 at the outer diameter wall 204 is not diverted into the stability bleed valve 60 or the cleaning apparatus 70 and follows the core flow path C from the low pressure compressor 44 through the intermediate case 45 to the high pressure compressor 52 (as best seen in FIG. 6).

Due to the complex shape and surface textures of the cleaning apparatus 70, additive manufacturing may be used to build the cleaning apparatus 70 out of the same material as the intermediate case 45. In some embodiments, the cleaning apparatus 70 is integrally formed with an engine case of the outer diameter wall 204 of the intermediate case 45. Alternatively, the cleaning apparatus 70 can be formed from a different material that the intermediate case 45, for instance, using material pairings that have similar thermal growth properties.

Control of one or more aspects of the gas turbine engine 20 can be performed by one or more controllers, such as controller 250. The controller 250 can be a full authority digital engine control that includes processing circuitry 252 and a memory system 254 configured to store a plurality of configuration items, where at least one of the configuration items includes a sequence of the computer executable instructions for execution by the processing circuitry 252. Other types of configuration items stored in the memory system 254 can include but are not limited to data, such as constants, configurable data, models, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 20. The processing circuitry 252 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 254 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The controller 250 can control various aspects of the gas turbine engine 20, including controlling the actuators 216 and 218. Further, the controller 250 can control speeds of the low pressure compressor 44 and the high pressure compressor 52 among other aspects of the gas turbine engine 20.

Figure 7:
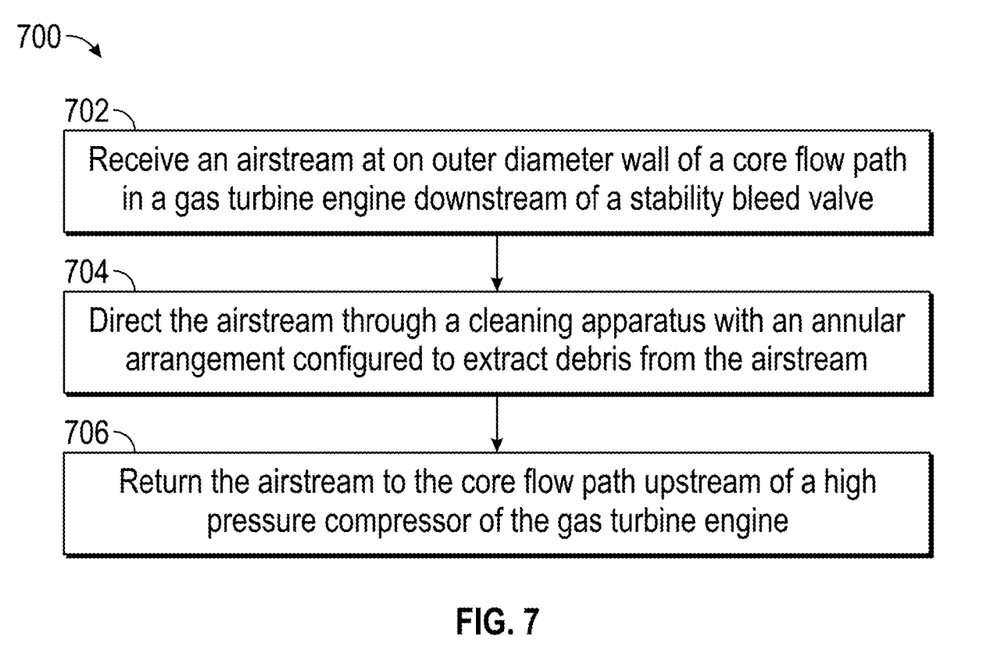
FIG. 7 is a flow chart illustrating a method in accordance with an embodiment of the disclosure.

Referring now to FIG. 7 with continued reference to FIGS. 1-6, FIG. 7 is a flow chart illustrating a method 700 for cleaning debris from a gas turbine engine 20 of an aircraft in accordance with an embodiment.

At block 702, an airstream 202 can be received at an outer diameter wall 204 of a core flow path C in a gas turbine engine 20 downstream of a stability bleed valve 60.

At block 704, a portion of the airstream 202, such as airstream 226, can be directed through a cleaning apparatus 70 with an annular arrangement 400 configured to extract debris from the airstream. The annular arrangement 400 can include a scroll portion 300 configured to extract debris. As previously described, the cleaning apparatus 70 can include an inlet 208 proximate to the low pressure compressor 44 of the gas turbine engine 20 and a channel 210 external to the outer diameter wall 204 of the core flow path C that defines an airflow path 212 between the inlet 208 and the scroll portion 300.

At block 706, the airstream (as cleaned airstream 206) can be returned to the core flow path C upstream of a high pressure compressor 52 of the gas turbine engine 20. Returning the airstream 206 to core flow path C can include directing the airstream 206 from the cleaning apparatus 70 in a direction substantially parallel to a flow direction of the airstream 224 in the core flow path C. This can take advantage of Bernoulli's principle, where lower velocity cleaned air is motivated by higher velocity core air. Debris can be captured by the annular arrangement 400 in a detachable debris collector 402 that is separable from the gas turbine engine 20 while the scroll portion 300 remains coupled to the gas turbine engine 20.

In embodiments, an inlet door 214 configured to open and close an air path between the core flow path C and the airflow path 212 at the inlet 208 can be controlled by an inlet door actuator 216 driven by controller 250 or mechanically controlled/driven through one or more mechanical linkages 215. The stability bleed valve 60 is upstream of the inlet 208, and the controller 250 can synchronize opening and closing of the inlet door 214 with opening and closing of the stability bleed valve 60. Synchronizing can allow the cleaning apparatus 70 to work in combination with the stability bleed valve 60 for debris removal. Alternately, the cleaning apparatus 70 may be used exclusively, without opening of the stability bleed valve 60, thereby eliminating the associated power loss at takeoff if the stability bleed valve 60 was opened. For example, the controller 250 can control the stability bleed valve 60 to be closed while the inlet door 214 is opened such that debris extraction is exclusively performed by the cleaning apparatus 70.

While the above description has described the flow process of FIG. 7 in a particular order, it should be appreciated that unless otherwise specifically required in the attached claims that the ordering of the steps may be varied.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An assembly of a gas turbine engine comprising:
a low pressure compressor;
a high pressure compressor;
an intermediate case between the low pressure compressor and the high pressure compressor, wherein a core flow path is defined through the low pressure compressor, the intermediate case, and the high pressure compressor; and
a cleaning apparatus having an annular arrangement about the intermediate case, the annular arrangement comprising a scroll portion configured to extract debris from an airstream at an outer diameter wall of the core flow path and return the airstream to the core flow path, wherein the cleaning apparatus comprises a detachable debris collector that is separable from the assembly while the scroll portion remains coupled to the assembly.

2. The assembly of claim 1, wherein the cleaning apparatus comprises an inlet proximate to the low pressure compressor.

3. The assembly of claim 2, wherein the cleaning apparatus comprises a channel external to the outer diameter wall of the core flow path that defines an airflow path between the inlet and the scroll portion.

4. The assembly of claim 2, further comprising an inlet door configured to open and close an air path between the core flow path and the airflow path at the inlet.

5. The assembly of claim 1, further comprising an airflow return port configured to return the airstream from the cleaning apparatus in a direction substantially parallel to a flow direction of the airstream in the core flow path.

6. The assembly of claim 1, wherein the cleaning apparatus is integrally formed with an engine case of the outer diameter wall of the intermediate case.

7. The assembly of claim 1, wherein the scroll portion comprises one or more debris collection surfaces having a different surface texture than other interior surfaces of the cleaning apparatus.

8. An assembly of a gas turbine engine comprising:
a low pressure compressor;
an inlet proximate to the low pressure compressor;
a high pressure compressor;
an intermediate case between the low pressure compressor and the high pressure compressor, wherein a core flow path is defined through the low pressure compressor, the intermediate case, and the high pressure compressor;
an inlet door configured to open and close an air path between the core flow path and an airflow path at the inlet;
a stability bleed valve upstream of the inlet;
a controller configured to synchronize opening and closing of the inlet door with opening and closing of the stability bleed valve; and
a cleaning apparatus having an annular arrangement about the intermediate case, the annular arrangement comprising a scroll portion configured to extract debris from an airstream at an outer diameter wall of the core flow path and return the airstream to the core flow path.

9. A method comprising:
receiving an airstream at an outer diameter wall of a core flow path in a gas turbine engine downstream of a stability bleed valve;
directing the airstream through a cleaning apparatus with an annular arrangement configured to extract debris from the airstream; and
returning the airstream to the core flow path upstream of a high pressure compressor of the gas turbine engine.

10. The method of claim 9, wherein the annular arrangement comprises a scroll portion configured to extract the debris.

11. The method of claim 10, wherein the cleaning apparatus comprises an inlet proximate to a low pressure compressor of the gas turbine engine and a channel external to the outer diameter wall of the core flow path that defines an airflow path between the inlet and the scroll portion.

12. The method of claim 11, further comprising:
controlling an inlet door configured to open and close an air path between the core flow path and the airflow path at the inlet.

13. The method of claim 12, wherein the stability bleed valve is upstream of the inlet and the method further comprises synchronizing opening and closing of the inlet door with opening and closing of the stability bleed valve.

14. The method of claim 12, wherein the stability bleed valve is closed while the inlet door is opened such that debris extraction is exclusively performed by the cleaning apparatus.

15. The method of claim 10, further comprising:
collecting the debris in the scroll portion on one or more debris collection surfaces having a different surface texture than other interior surfaces of the cleaning apparatus; and
collecting the debris captured by the annular arrangement in a detachable debris collector that is separable from the gas turbine engine while the scroll portion remains coupled to the gas turbine engine.

16. The method of claim 9, wherein returning the airstream to the core flow path comprises directing the airstream from the cleaning apparatus in a direction substantially parallel to a flow direction of the airstream in the core flow path.

17. An intermediate case of a gas turbine engine, the intermediate case comprising:
an inner diameter wall;
an outer diameter wall, wherein a core flow path is defined between the inner diameter wall and the outer diameter wall;
a cleaning apparatus having an annular arrangement about the outer diameter wall, the annular arrangement comprising a scroll portion configured to extract debris from an airstream at the outer diameter wall and return the airstream to the core flow path; and
an airflow return port configured to return the airstream from the cleaning apparatus in a direction substantially parallel to a flow direction of the airstream in the core flow path.

18. The intermediate case of claim 17, wherein the cleaning apparatus comprises an inlet and a channel external to the outer diameter wall that defines an airflow path between the inlet and the scroll portion.

19. The intermediate case of claim 18, wherein the cleaning apparatus is integrally formed with an engine case of the outer diameter wall.

\* \* \* \* \*